United States Patent
Servi

(10) Patent No.: US 6,397,066 B1
(45) Date of Patent: May 28, 2002

(54) FAST METHOD FOR CAPACITY ESTIMATION OF SYSTEMS

(75) Inventor: Leslie D. Servi, Lincoln, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/430,202

(22) Filed: Oct. 29, 1999

(51) Int. Cl.[7] ................................................. H04Q 7/20
(52) U.S. Cl. ....................... 455/446; 455/67.1; 455/67.4
(58) Field of Search ............................... 455/67.1, 67.4, 455/67.6, 446, 450, 423, 434, 435; 379/133, 134, 237; 709/224, 226

(56) References Cited

U.S. PATENT DOCUMENTS

| | | | | |
|---|---|---|---|---|
| 5,253,248 A | * | 10/1993 | Dravida et al. | 370/228 |
| 5,583,792 A | * | 12/1996 | Li et al. | 709/224 |
| 5,884,037 A | * | 3/1999 | Aras et al. | 709/226 |
| 5,886,907 A | * | 3/1999 | Abu-Amara et al. | 370/232 |
| 6,209,033 B1 | * | 3/2001 | Datta et al. | 709/224 |
| 6,314,293 B1 | * | 11/2001 | Servi et al. | 455/450 |

OTHER PUBLICATIONS

Sung–Ho Choi; Sohraby, K.. A Quality base birth and death queueing model for evaluating the performance of an integrated voice / data CDMA cellular system. Vehicular Technology, IEEE transactions on, vol.: 48 Issue:1, Jan. 1999, pp.: 83–88.*

Garcia–Berumen, A.; Vargas–Rosales, C. Mobility effects in a wireless ATM network with fixed routing. Communications, 1999. ICC '99. 1999 IEEE International Conference on, 1999, pp.: 1987–1991 vol. 3.*

Sallent, O; Agusti, R. Adaptive S–ALOHA CDMA as an alternative way of Integrating Services in Mobile Environments. Vehicular Technology, IEEE Transactions on, vol.: 49 Issue:3, May 2000 pp. 936–947.*

Samaras, K; Demetrescu, C.; Yan, R. Capacity of a packet switched cellular network with link adaptation. Communications, 2000. ICC 2000. 2000 IEEE International Conference on, vol. 2000.*

Gisela Engeln–Müllges and Frank Uhlig, Numerical Algorithms with Fortran, Springer, 1996, pp. 121 and 583.

P. Tran–Gia and M. Mandjes, "Modeling of Customer Retrial Phenomenon in Cellular Mobile Networks," IEEE Journal on Selected Areas in Communications, vol. 15, No. 8, pp. 1406–1414.

* cited by examiner

*Primary Examiner*—Nay Maung
*Assistant Examiner*—Sonny Trinh
(74) *Attorney, Agent, or Firm*—Leonard Charles Suchyta; James K. Weixel

(57) ABSTRACT

A method reduces the number of computer operations required to analyze many performance measurement issues of wireless systems. A multi-dimensional birth-death model is configured to address a performance analysis issue. The method consists of selecting a first group of states from the multi-dimensional birth-death model and determining a relationship between the non-selected states and this first group of states. Thereafter, the probabilities of being in the first group of states are calculated. Once calculated, the probabilities of being in the remaining states can be calculated using the relationship between the non-selected states and the first group of states and the calculated probabilities of the first group of states. The determined probabilities are used to analyze the performance issue.

8 Claims, 9 Drawing Sheets

US 6,397,066 B1

FAST METHOD FOR CAPACITY ESTIMATION OF SYSTEMS

FIELD OF THE INVENTION

The present invention relates generally to wireless communication systems and, more particularly, to a system and method for modeling and analyzing complex issues in a wireless communication system.

BACKGROUND OF THE INVENTION

The cellular industry has made phenomenal strides in commercial operations both in the United States and the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

In addition to the challenges posed by the need for greater system capacity, the designers of future wireless communication systems have their own unique set of challenges. For example, in order to engineer efficient wireless systems, designers need to be able to quickly and accurately estimate the capacity of a wireless communication system and analyze its performance.

Conventional approaches to capacity estimation and performance analysis involve the use of analytical formulae, computer simulations, or classical numerical methods. The use of analytical formulae, however, generally necessitates unrealistic assumptions (e.g., ignoring redialing or abandoning behavior of wireless customers when estimating the capacity of a wireless system). Similarly, the use of computer simulations typically requires a substantial setup time and achieves a less accurate estimate. In addition, the use of classical numerical methods generally requires an amount of computation time that makes use of such methods impractical.

A class of analytical models exists, called "multi-dimensional birth-death models," that can be easily used to accurately model many capacity estimation and performance analysis issues. Unfortunately, the classical numerical approach to solving these models is well known as an excessively slow and frequently impractical approach for large systems.

FIG. 1 illustrates a general two-dimensional birth-death model 100 that can be used to model many capacity estimation and performance analysis issues. The two-dimensional birth-death model 100 includes several states 110. Each state represents how something is: its configuration, attributes, condition, or information content. For example, a state may represent a specific number of voice calls and a specific number of data calls occupying a channel in a wireless system at a given instance.

As illustrated, a system may transition from a first state to any of its nearest neighboring states. For example, a system may transition from state 110a to its neighboring state to the west, its neighboring state to the south, its neighboring state to the east, its neighboring state to the southwest, or its neighboring state to the southeast.

A two-dimensional birth-death model, such as model 100, can be used to analyze a variety of telecommunications issues, as well as other types of issues. For example, three areas of importance to designers of wireless systems that can be represented by two-dimensional birth-death models include analyzing wireless traffic in a system while taking into account the effects of redial traffic, analyzing wireless traffic in a system while taking into account the effects of handoff traffic, and analyzing the use of different priority schemes in a wireless system having both voice and data traffic.

Conventional approaches to estimating the capacity of a cell site, such as the use of analytical formulae, typically consider only the regular traffic at the cell site. Such approaches do not, however, take into account the effects of customers redialing in those situations when an original call to the cell site is blocked. In order to obtain a more accurate estimate of the capacity of the cell site, both regular traffic and redial traffic should be considered. A two-dimensional birth-death model may be used to estimate the capacity of a system having both types of traffic. One dimension of the model (e.g., the horizontal axis of the model 100 in FIG. 1) may be assigned to the number of channels in use in the cell site while the other dimension (e.g., the vertical axis of model 100) may be assigned to the number of customers who have been blocked, but may redial. By taking redial traffic into account when estimating a cell site's capacity, a more accurate estimation may be obtained.

A two-dimensional birth-death model may also be used to analyze wireless traffic in a system while taking into account regular and handoff traffic. Typically, system designers treat both types of traffic the same in order to simplify system analyses. In order to increase customer satisfaction, however, regular traffic and handoff traffic should be treated differently. For example, from a customer satisfaction perspective, it is often better to block a customer attempting a new telephone call than to drop a customer in the middle of a telephone call. When analyzing such a system using a two-dimensional birth-death model, one dimension may be assigned to the number of new calls in the system and the other dimension to the number of hand-in calls. Such a model would allow system designers to analyze different types of reservation (or priority assignment) techniques.

Similarly, if a channel in a wireless system handles both voice and data traffic, it may be desirable to assign different levels of priority to the traffic types. A two-dimensional birth-death model could represent such a system. System designers could analyze the effects of the different levels of priority by assigning one dimension of the two-dimensional birth-death model to the number of voice calls in the system and the other dimension to the number of data calls in the system. As a result, a variety of priority schemes can be easily analyzed.

To analyze two-dimensional birth-death models, the steady state ergodic probability of a column vector being in the set of states ((j, 0), . . . , (j, n)) is defined as $\underline{e}_j = (e_{j0}, \ldots, e_{jn})^T$, where $e_{j0}$ is the probability of being in state (j, 0) and $e_{jn}$ is the probability of being in state (j, n), and the infinitesimal generator of the probability flow from (j, i) to (j−1, k) to be $[v_j^-]_{i,k}$, from (j, i) to (j+1, k) to be $[v_j^+]_{i,k}$, from (j, i) (j, k) to be $[v_j^0]_{i,k}$ if i≠k and the total probability flow out of (j, i) to be $-[v_j^0]_{i,i}$, i.e., $-[v_j^0]_{i,i} = \Sigma_k ([v_j^+]_{i,k} + \chi_{(i \neq k)}[v_j^0]_{i,k} + [v_j^-]_{i,k})$ so $$(v_j^+ + v_j^0 + v_j^-)\underline{1} = \underline{0} \qquad (1)$$

where $v_j^0$, $v_j^0$, and $v_j^-$, are matrices, and $\underline{1}$ and $\underline{0}$ are vectors consisting of only 1's and 0's, respectively.

Two-dimensional birth-death equations have a steady state solution satisfying $$\chi_{\{j\neq 0\}}\underline{e}_{j-1}{}^T v_{j-1}{}^+ + \underline{e}_j{}^T v_j{}^0 + \chi_{\{j\neq n\}}\underline{e}_{j+1}{}^T v_{j+1}{}^- = \underline{0} \quad j=0, \ldots, m, \quad (2)$$

and $$\sum_{j=0}^{m} \underline{e}_j^T \underline{1} = 1. \quad (3)$$

In general, when the condition of the subscript associated with $\chi$ is true, the value of $\chi$ equals 1 and equals 0 otherwise. In equation 2, therefore, $\chi_{\{j\neq 0\}}$ equals 1 when $j\neq 0$ and equals 0 when $j=0$.

To simplify future notation, assume $$v_0^- = v_m^+ = 0. \quad (4)$$

where $v_0^-$ and $v_m^+$ are (m+1×m+1) matrices and 0 is a matrix consisting only of 0's. Note that equations (2) and (3) are the solution to equations $$\underline{e}^T v = \underline{0}$$

and $$\underline{e}^T \underline{1} = 1$$

where $\underline{e}^T = (\underline{e}_0{}^T, \underline{e}_1{}^T, \ldots, \underline{e}_n{}^T)$ is a 1×(n+1)(m+1) vector and $$v = \begin{pmatrix} v_0^0 & v_0^+ & 0 & 0 & \cdots & 0 & 0 \\ v_1^- & v_1^0 & v_1^+ & 0 & \cdots & 0 & 0 \\ 0 & v_2^- & v_2^0 & v_2^+ & \cdots & 0 & 0 \\ 0 & 0 & v_3^- & v_3^0 & \cdots & 0 & 0 \\ 0 & 0 & 0 & v_4^- & \cdots & 0 & 0 \\ 0 & 0 & 0 & 0 & \cdots & v_{m-2}^+ & 0 \\ \cdots & \cdots & \cdots & \cdots & \cdots & v_{m-1}^0 & v_{m-1}^+ \\ 0 & 0 & 0 & 0 & \cdots & v_m^- & v_m^0 \end{pmatrix}$$

is an (n+1)(m+1)×(n+1)(m+1) block tridiagonal matrix where each block is itself a (n+1)×(n+1) tridiagonal matrix. This special structure is referred to hereinafter as a "recursively tridiagonal" structure. A recursively tridiagonal matrix, therefore, is a matrix that is block tridiagonal, and each block is block tridiagonal, and each of these blocks is block tridiagonal, etc.

As illustrated, the matrix v consists of three diagonal lines of blocks. For example, blocks $v_0^0$, $v_1^0$, $v_2^0$, and $v_3^0$ make up the main diagonal of matrix v. The other diagonals that exist just above and just below the main diagonal consist of blocks $v_0^+$, $v_1^+$, and $v_2^+$ and blocks $v_1^-$, $v_2^-$, and $v_3^-$, respectively. Each of the blocks of matrix v, as set forth above, has a tridiagonal structure. It is apparent from the structure of matrix v that a large number of zeros exist and that they exist in regular locations (i.e., to the northeast and southwest of the three diagonal lines of blocks).

Linear equations $\underline{e}^T v = \underline{0}$ and $\underline{e}^T \underline{1} = 1$ may be solved using a variety of numerical approaches, the most common being the use of Gaussian elimination. Gaussian elimination requires on the order of (m³×n³) multiplication operations for an (mn×mn) matrix. Therefore, for example, for a matrix where the values of m and n are each 100, 1×10¹² multiplication operations would be necessary using Gaussian elimination. Consequently, as the number of rows and/or columns of the matrix increases, the number of multiplication operations increases dramatically. As such, Gaussian elimination proves to be an extremely slow solution to the performance analysis and capacity estimation of large telecommunications systems.

As an alternative to the use of Gaussian elimination, a block Gaussian algorithm may be used to solve two-dimensional birth-death equations. The block Gaussian algorithm exploits the fact that the v matrix is block tridiagonal (i.e., it exploits the fact that there are a large number of zeros and that they are in regular locations in the matrix), but does not exploit the fact that each of the blocks in the matrix v is tridiagonal. The number of multiplication operations needed to solve a two-dimensional birth-death equation using the block Gaussian algorithm is on the order of (m×n³). Consequently, use of a block Gaussian algorithm greatly reduces the number of multiplication operations needed in comparison to the Gaussian elimination when a large value of m exists. However, this algorithm is still an extremely slow solution to the performance analysis and capacity estimation of large telecommunications systems.

Therefore, there exists a need for a system and method that quickly and accurately solves multi-dimensional birth-death equations.

SUMMARY OF THE INVENTION

Systems and methods consistent with the present invention address this need by providing a process that reduces the number of multiplication operations needed for solving multi-dimensional birth-death equations.

In accordance with the purpose of the invention as embodied and broadly described herein, a method consists of selecting a first group of states from a multi-dimensional birth-death model and determining a relationship between the non-selected states and this first group of states. Thereafter, the method calculates the probabilities of being in the first group of states. Then, the method calculates the probabilities of being in the non-selected states using the relationship between the non-selected states and the first group of states and the calculated probabilities of the first group of states. The method solves the multi-dimensional birth-death model using the calculated probabilities of the first group of states and the non-selected states.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a mechanism that reduces the number of computer operations needed to analyze many performance analysis measures of systems, such as wireless communication systems. A multi-dimensional birth-death model is constructed to address a performance analysis issue. By selecting a first group of states from the multi-dimensional birth-death model and determining a relationship between the non-selected states and this first group of states, determination of the probabilities of the states of the multi-dimensional birth-death model is greatly simplified.

A. EXEMPLARY NETWORK

Figure 1:
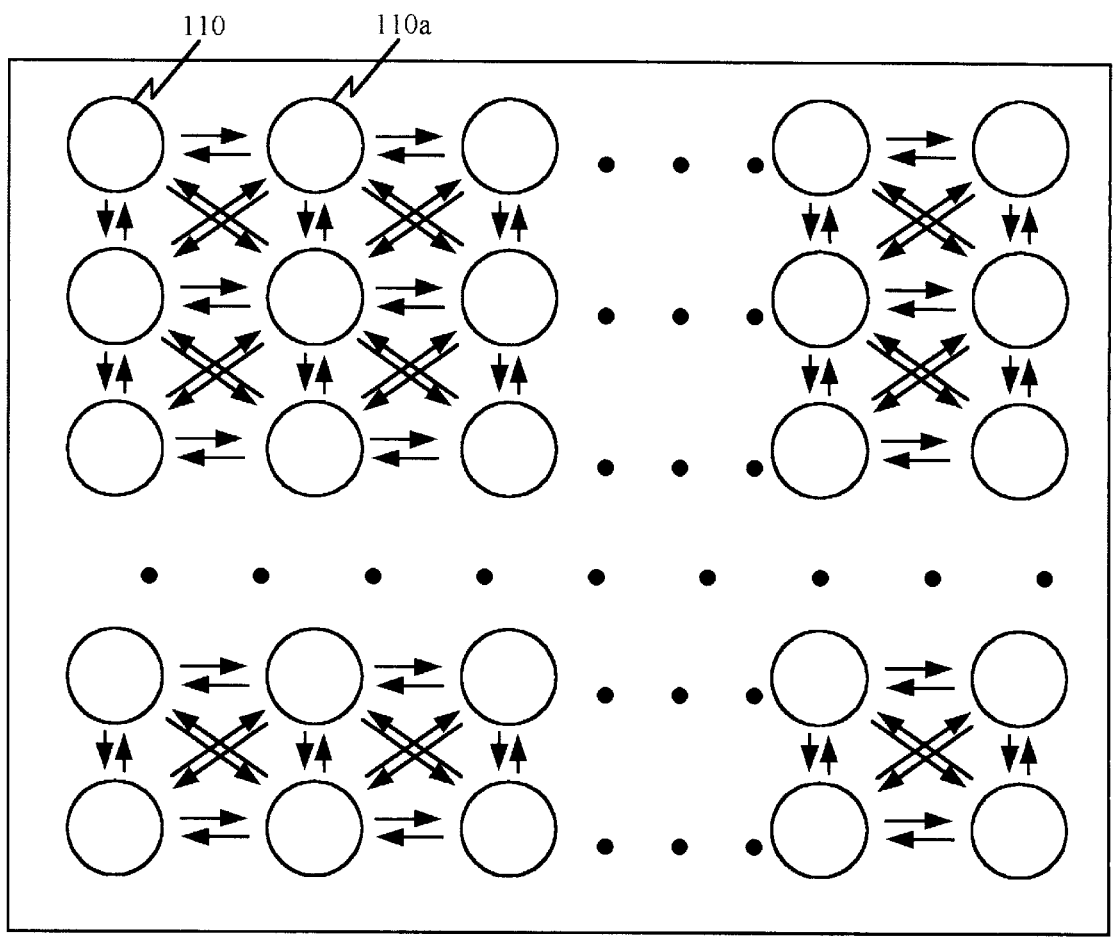
FIG. 1 illustrates a general two-dimensional birth-death model that can be used to model a capacity and performance analysis factor.
Figure 2:
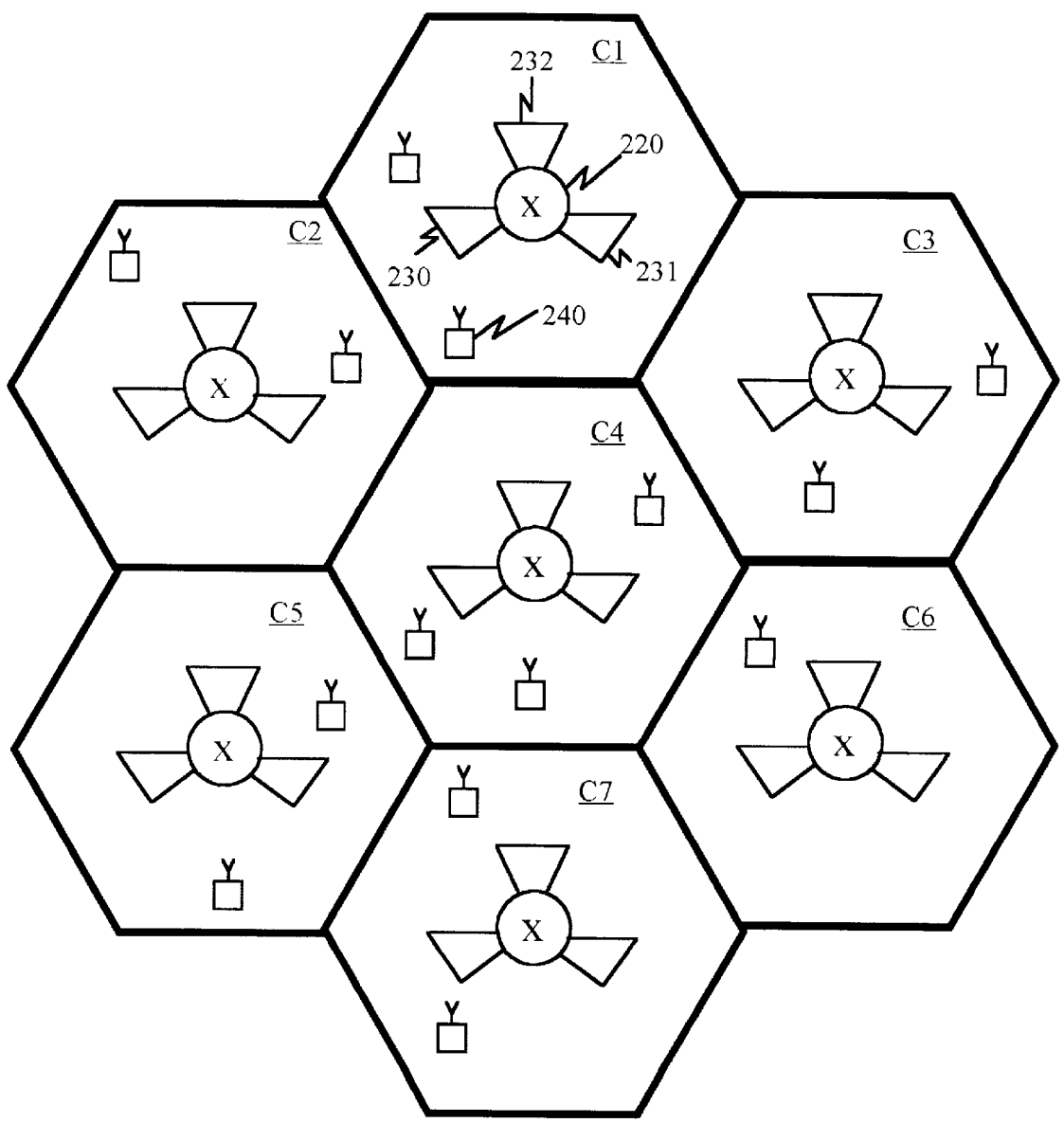
FIG. 2 illustrates an exemplary wireless communication network to which a process that solves multi-dimensional birth-death equations consistent with the present invention may be applied in order to address associated performance issues.

FIG. 2 illustrates an exemplary wireless communication network to which a process that solves multi-dimensional birth-death equations consistent with the present invention may be applied in order to address associated performance issues. In FIG. 2, network 200 includes several contiguous wireless coverage areas, or cells, C1–C7. While the network shows only seven cells, the actual number of cells may be much larger or smaller in practice.

Each of the cells C1–C7 includes a base station 220, having three directional antennas 230–232, and may, at any given time, include one or more conventional wireless stations 240. The base station 220 is a conventional base station that receives information from and transfers information to the wireless stations 240. Each wireless station 240 communicates with the base station 220 in a well known manner.

B. EXEMPLARY SYSTEM CONFIGURATION

Figure 3:
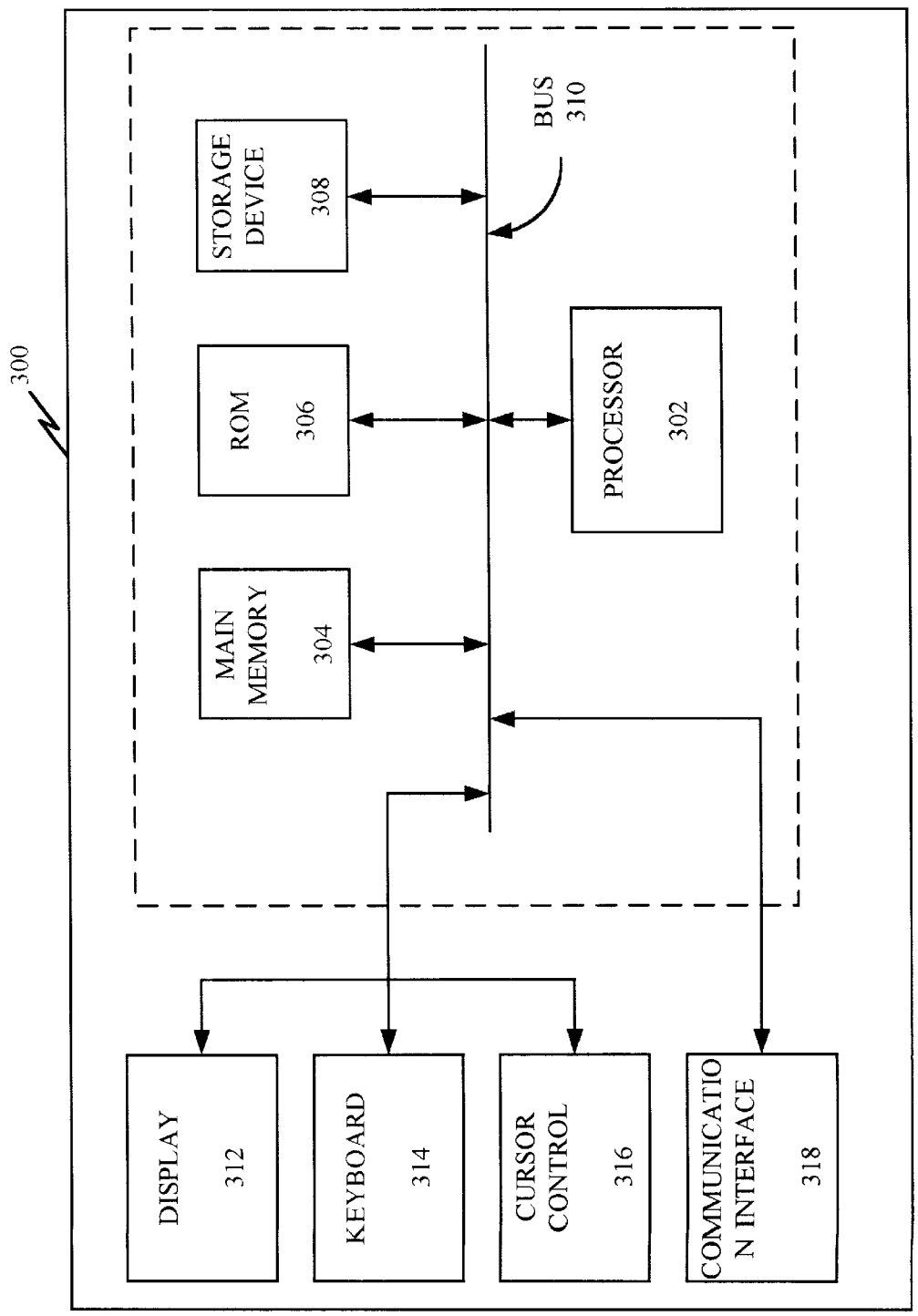
FIG. 3 illustrates an exemplary system, consistent with the present invention, that allows for modeling and analysis of performance issues related to a wireless network.

FIG. 3 illustrates an exemplary system 300, consistent with the present invention, that allows for modeling and analysis of performance issues related to a wireless network, such as network 200. The exemplary system 300 may be included in the wireless communication network 200 (e.g., in base station 220) or may be separate therefrom.

In FIG. 3, the exemplary system 300 includes a processor 302, main memory 304, read only memory (ROM) 306, storage device 308, bus 310, display 312, keyboard 314, cursor control 316, and communication interface 318.

The processor 302 may be any type of conventional processing device that interprets and executes instructions. Main memory 304 may be a random access memory (RAM) or a similar dynamic storage device. Main memory 304 stores information and instructions to be executed by processor 302. Main memory 304 may also store temporary variables or other intermediate information used during execution of instructions by processor 302. ROM 306 stores static information and instructions for processor 302. ROM 306 may be replaced with some other type of static storage device. The data storage device 308 may include any type of magnetic or optical disk and its corresponding disk drive. Data storage device 308 stores information and instructions for use by processor 302. Bus 310 includes a set of hardware lines (conductors) that allows for data transfer among the components of the system 300.

The display device 312 may be a cathode ray tube (CRT), or the like, for displaying information to an operator. The keyboard 314 and cursor control 316 allow the operator to interact with the system 300. The cursor control 316 may be, for example, a mouse.

Communication interface 318 enables the system to communicate with other devices/systems via any communications medium. For example, communication interface 318 may be a modem or an Ethernet interface to a LAN. Alternatively, communication interface 318 may be any other interface that enables communication between the system 300 and other devices or systems.

As will be described in detail below, multi-dimensional birth-death equations may be used to quickly and accurately analyze many telecommunications issues. A technique consistent with the present invention drastically reduces the number of multiplication operations necessary for solving multi-dimensional birth-death equations. The system 300 performs the functions necessary to analyze a performance issue associated with a wireless network in response to processor 302 executing sequences of instructions contained in, for example, memory 304. Such instructions may be read into memory 304 from another computer-readable medium, such as a data storage device 308, or from another device via communication interface 318. Execution of the sequences of instructions contained in memory 304 causes processor 302 to perform a method that will be described hereafter. Alternatively, hard-wired circuitry may be used in place of or in combination with software instructions to implement the present invention. Thus, the present invention is not limited to any specific combination of hardware circuitry and software.

C. EXEMPLARY PROCESS FOR SOLVING BIRTH-DEATH EQUATIONS

An exemplary process for solving two-dimensional birth-death equations consistent with the present invention exploits the special structure (i.e., the recursively tridiagonal structure) of the two-dimensional birth-death model. As such, the number of multiplication operations needed to solve these birth-death equations can be drastically reduced as compared to conventional techniques.

1. General Overview

Figure 4:
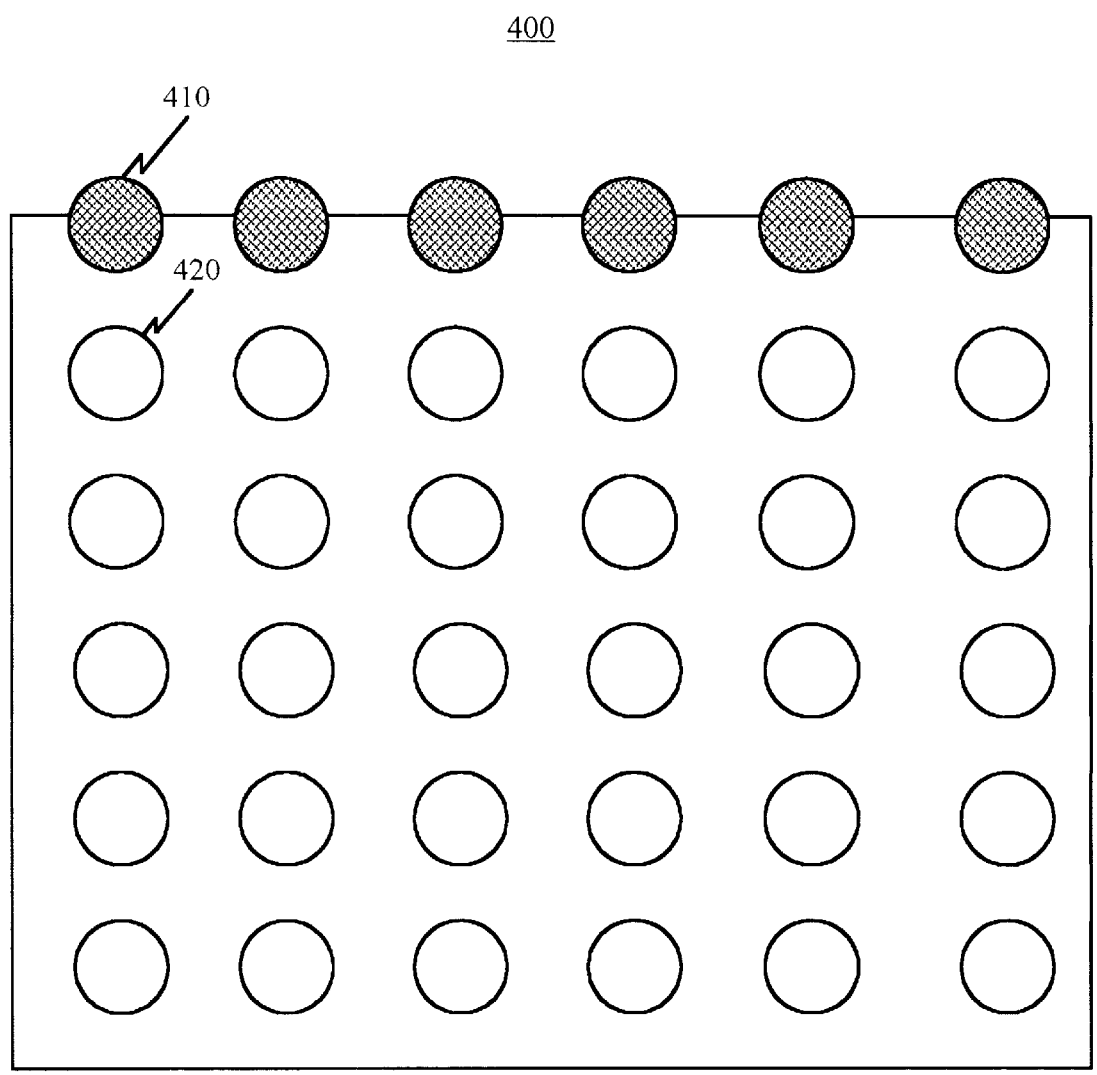
FIG. 4 illustrates an exemplary two-dimensional set of states consistent with the present invention.

FIG. 4 illustrates an exemplary two-dimensional set of states 400 consistent with the present invention that may be used to analyze a variety of telecommunications issues. For example, a telecommunications system designer could use the set of states 400 to analyze priority schemes in a system having voice and data traffic. The set of states 400 may include 36 states 410 and 420 formed in 6 rows and 6 columns. The shaded states 410 are referred to as "boundary" states and the non-shaded states 420 are referred to as "interior" states.

Figure 5:
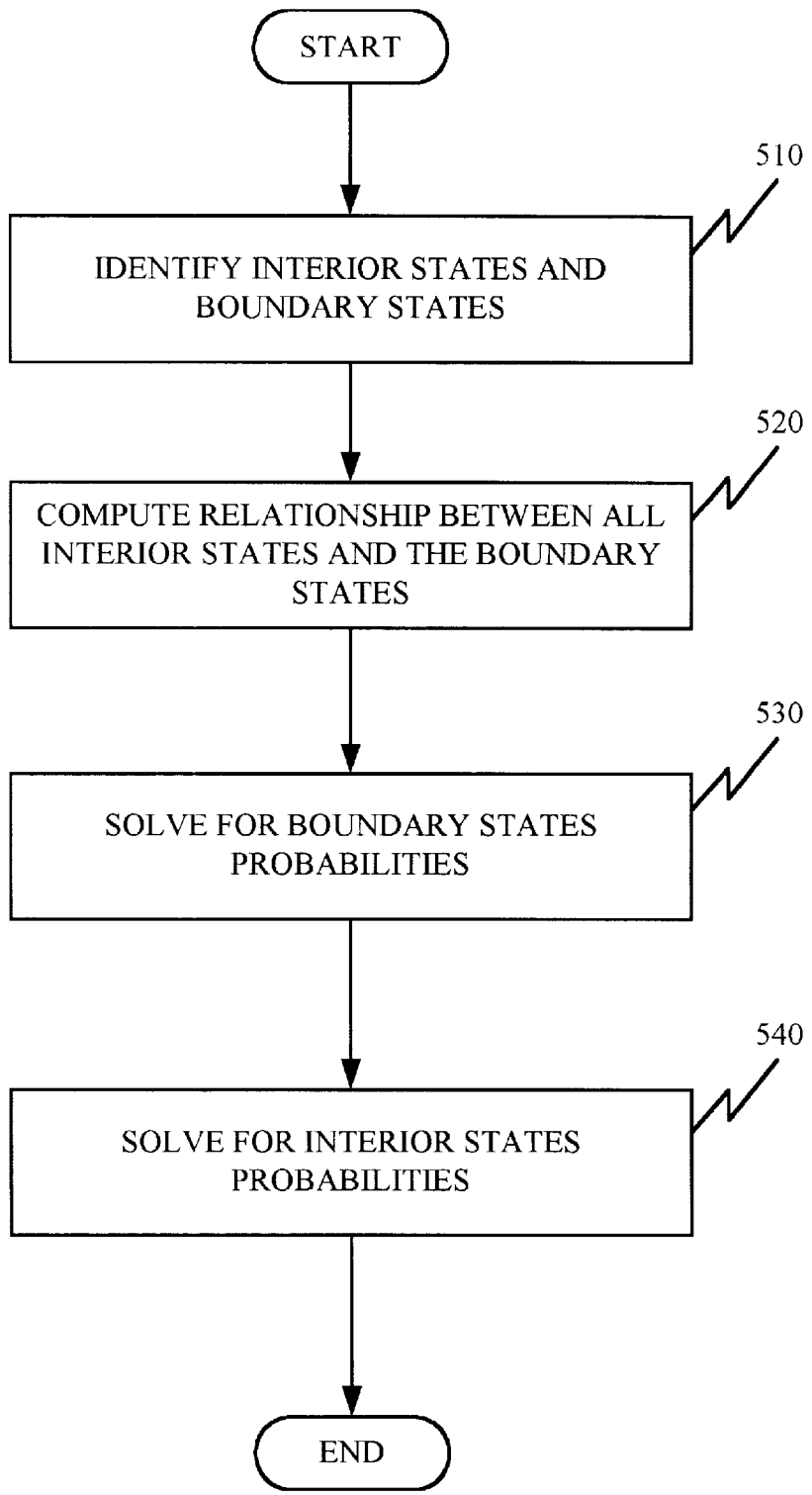
FIG. 5 illustrates a general overview of an exemplary process that solves two-dimensional birth-death equations consistent with the present invention.

FIG. 5 illustrates a general overview of an exemplary process that solves two-dimensional birth-death equations consistent with the present invention. The exemplary process begins by carefully selecting a group of states (e.g., states 410) from the two-dimensional set of states 400 as boundary states (step 510). The boundary states 410 are selected so as to exploit the tridiagonal structure of a two-dimensional birth-death equation. Other techniques for selecting the boundary states 410 may alternatively be used. The states that were not selected as boundary states are identified as interior states 420.

After selecting boundary states 410 and interior states 420, the process computes a relationship between all the interior states 420 and the boundary states 410 (step 520). This step defines the probabilities of being in the interior states in terms of the boundary states 410. As a result, if the boundary states 410 are known, then the interior states 420 can easily be determined.

Having all of the interior states 420 defined in terms of the boundary states 410, the process solves for the probabilities of being in the boundary states 410 (step 530). Step 530 involves solving an equation with six unknowns. Because there are so few unknowns, the equation can be solved relatively fast.

Having determined the probabilities of being in the boundary states 410 and having defined the relationship between the boundary states 410 and the interior states 420, the process calculates the probabilities of being in the interior states 420 (step 540).

2. An Exemplary Process That Solves Two-Dimensional Birth-Death Equations

As set forth above with respect to equations (1) through (4), solving a two-dimensional birth-death equation involves solving the following two linear equations: $\underline{e}^T v = \underline{0}$ and $\underline{e}^T \underline{1} = 1$. The variable $\underline{e}$ represents a vector, where each of its components represents the probability of being in a certain state, and $v$ represents the infinitesimal generator (i.e., the rate of transition from one state to another).

From equation (1), $$v\underline{1}=\underline{0}.$$

This is evident from the fact that if $v$ is singular, equation (2) contains a redundant equation. If the value of $j$ is fixed in equation (2) and one row of the matrix $v$ is replaced by the normalization equation (3), then the resulting system of equations will typically have a unique solution. (A more precise condition for a unique solution is that $v$ has a rank of $(n+1)\times(m+1)-1$ and that each column of $v$ is independent of $\underline{1}$. However, if equations (2) and (3) represent the ergodic equations of a connected state space then, from classical ergodic theory, there is a unique solution.)

If $v_j^+$ is singular, a backwards recursive numerical solution to equation (2) is impossible and one is forced to identify an equivalent formulation of equation (2) for which the corresponding matrix is non-singular. To overcome this hurdle, suppose $n^*$ is defined by $$[v_j^+]_{ik}=0 \text{ for } i=0,\ldots,n^* \text{ and all } k \text{ and } j. \quad (5)$$

The process defines $\underline{x}_j^T = (x_{j,0}, \ldots, x_{j,n})$ implicit in $$e_{j,i} = \begin{cases} x_{j,i} & \text{for } i=0,\ldots,n^* \\ x_{j+1,i} & \text{for } i=n^*+1,\ldots,n \end{cases} \quad (6)$$

with $$x_{0,i}=0 \ i=n^*+1,\ldots,n \text{ and } x_{m+1,i}=0 \ i=0,\ldots,n^*. \quad (7)$$

Next the process defines the $(n+1\times n+1)$ dimensional matrices, $N_j^+$, $N_j^0$, and $N_j^-$ such that for all $k$ $$[N_j^-]_{ik}=0, [N_j^0]_{ik}=[v_j^-]_{ik}, \text{ and } [N_j^+]_{ik}=[v_j^0]_{ik} \text{ for } i=1,\ldots,n^* \quad (8)$$

and $$[N_{j+1}^-]_{ik}=[v_j^-]_{ik}, [N_{j+1}^0]_{ik}=[v_j^0]_{ik}, \text{ and } [N_{j+1}^+]_{ik}=[v_j^+]_{ik} \text{ for } i=n^*+1,\ldots,n. \quad (9)$$

Equation (2) is equivalent to $$\underline{x}_j^T N_j^+ = -\underline{x}_{j+1}^T N_{j+1}^0 - \chi_{\{j-m\}}\underline{x}_{j+2}^T N_{j+2}^-, \ j=m,\ldots,0 \quad (10)$$

and hence, it will be this equation, and not equation (2) that will be solved.

Let $X_{m+1}$ be an $(n+1)\times(n-n^*)$ matrix of column vectors that spans all feasible values of $\underline{x}_{m+1}$ using equation (7), e.g., let $$[X_{m+1}]_{ip}=\chi_{\{i=p+n^*+1\}} \text{ for } i=0,\ldots,n \text{ and } p=0,\ldots,n-n^*-1 \quad (11)$$

and assume that $$x_{j,i} = \sum_{p=0}^{n-n^*-1} x_{m+1,p+n^*+1}[X_j]_{ip}, \ j=0,\ldots,m+1 \quad (12)$$

for the unknown vector $\underline{x}_{m+1}$ where $X_j$ is an $(n+1)\times(n-n^*)$ matrix for $j \neq 0$ and an $(n^*+1)\times(n-n^*)$ matrix for $j=0$.

By combining equations (10), (11), (12), and the normalizing equation $$1 = \sum_{j=0}^{m}\sum_{i=0}^{n} e_{j,i} = \sum_{j=0}^{m}\sum_{i=0}^{n^*} x_{j,i} + \sum_{j=0}^{m}\sum_{i=n^*+1}^{n} x_{j+1,i} \quad (13)$$

the process may recursively solve for $X_j$ and then solve for $\underline{x}_{m+1}$, using equation (12) to find $\underline{x}_j$ for all $j$, and then using equation (6) to find $\underline{e}_j$ for all $j$.

a. Exemplary Process That Solves AX=B If A Is Tridiagonal and Non-Singular

A process that solves birth-death equations consistent with the present invention involves repetitively solving $X^T A^T = B^T$ or $$AX=B \quad (14)$$

having $O(n(n-n^*))$ multiplication operations where A is an $(n+1)\times(n+1)$ non-singular tridiagonal matrix whose $(i,k)^{th}$ component is $a_{i,k}$, X is an $(n+1)\times(n-n^*)$ matrix whose $(i,p)^{th}$ component is $x_{i,p}$, and B is an $(n+1)\times(n-n^*)$ matrix whose $(i,p)^{th}$ component is $b_{i,p}$. To more naturally accommodate applications, the indexing of the matrices start at 0 rather than 1. To implement the process, there is substantial memory savings if the structure of A is exploited by representing A using three vectors, $\underline{a}^+$, $\underline{a}^0$, $\underline{a}^-$, whose $i^{th}$ components are $a_i^+=\chi_{i<n}a_{i,i+1}$, $a_i^0=a_{i,i}$, and $a_i^-=\chi_{i>0}a_{i,i-1}$.

A process consistent with the present invention assumes that $x_{j,p}=c_{j,p}+d_j x_{i^*,p}$ for block $j=i^*,\ldots,i$, and exploits the tridiagonal structure to find a self-consistency equation to solve for $x_{i^*,p}$. This process is solved in blocks because, otherwise, equations (15) and (16) below cannot be evaluated if $a_{i,i+1}=a_i^+=0$.

An exemplary process, consistent with the present invention, that solves AX=B when A is tridiagonal and non-singular consists of the following:

STEP 1: Set $i^*=0$, $d_0=1$, and $c_{0,p}=0$ for $p=0,\ldots,n-n^*-1$.

STEP 2: For $i=0,\ldots,n$:

IF $a_i^+ \neq 0$ and $i<n$, then set $$c_{i+1,p} = \frac{b_{i,p} - \chi_{\{i=i^* \& i>0\}}a_{i^*}^- X_{i^*-1,p} - \chi_{\{i>i^*\}}a_i^- c_{i-1,p} - a_i^0 c_{i,p}}{a_i^+}, \ p=0,\ldots,n-n^*-1 \quad (15)$$

and $$d_{i+1} = \frac{-\chi_{\{i>i^*\}}a_i^- d_{i-1} - a_i^0 d_i}{a_i^+}. \quad (16)$$

ELSE, for p=0, ..., n−n*−1, set $$x_{j,p} = \begin{cases} b_{i,p} - \chi_{\{i=i^* \& i>0\}} a_{i^*}^- x_{i^*-1,p} - & (17) \\ \dfrac{\chi_{\{i>i^*\}} a_i^- c_{i-1,p} - a_i^0 c_{i,p}}{\chi_{\{i>i^*\}} a_i^- d_{i-1} - a_i^0 d_i} & j = i^* \\ c_{j,p} + d_j x_{i^*,p} & j = i^*+1, \ldots, i \end{cases}$$

and then set i=i+1, $d_{i^*}$=1, and $c_{i^*,p}$=0 for p=0, ..., n−n*−1.

b. Exemplary Process that Solves Two-Dimensional Birth-Death Equations

Using the process that solves AX=B, an exemplary process consistent with the present invention that solves a two-dimensional (row-continuous) birth-death model can be described. The general approach is to repetitively solve equations (10) and (13), a variation of equations (2) and (3), using the above-described process (i.e., the process that solves $X^T A^T = B^T$) based on n−n* different choices for $\underline{x}_{m+1}$ and then to recognize that the solution to equations (2) and (3) is an appropriate linear combination of these solutions (i.e., it follows equation (12)).

Figure 6A:
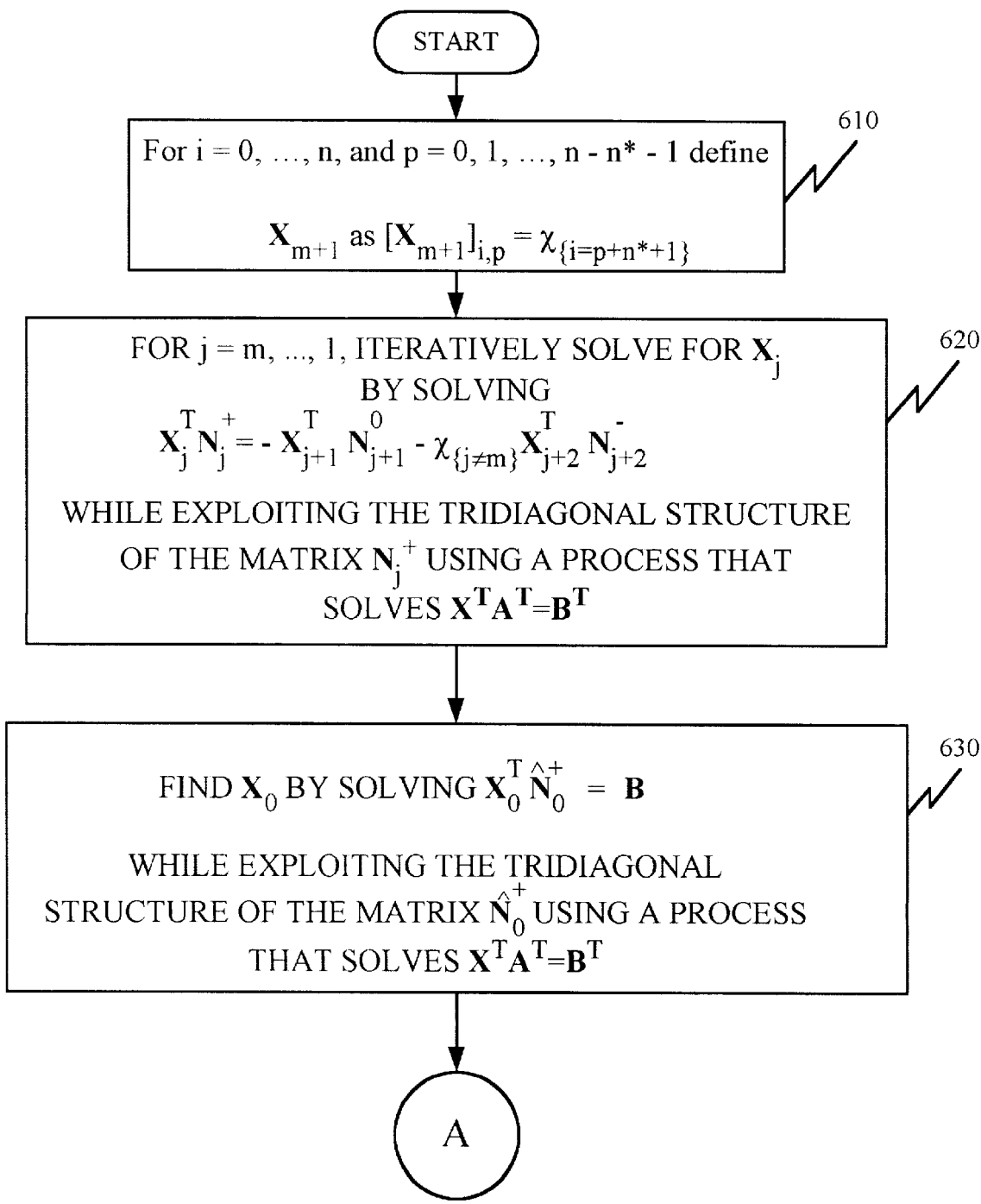
FIGS. 6A and 6B illustrate an exemplary process consistent with the present invention that solves two-dimensional birth-death equations.
Figure 6B:
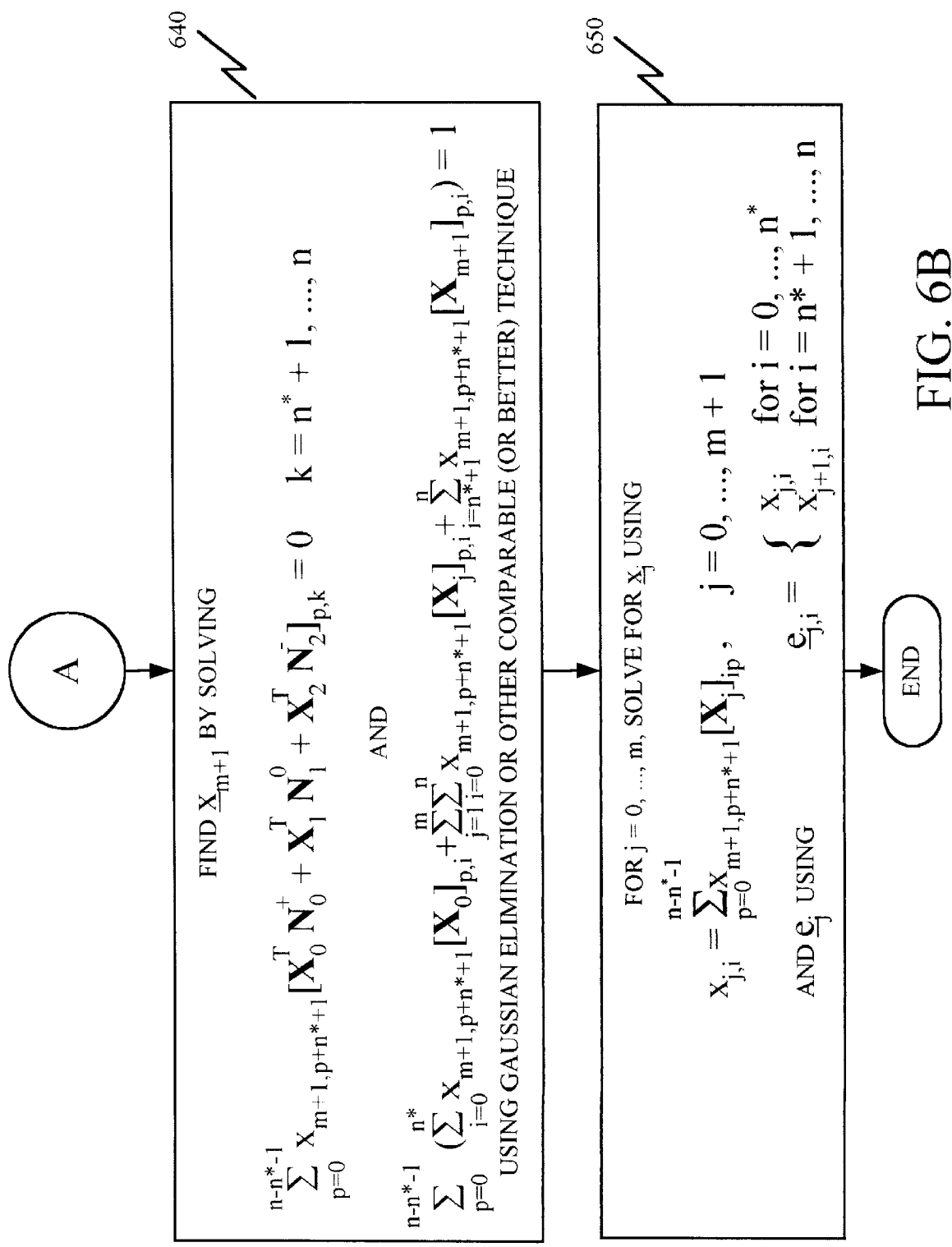

FIGS. 6A and 6B illustrate an exemplary process consistent with the present invention that solves two-dimensional birth-death equations. The exemplary process consists of the following:

STEP 610 (FIG. 6A): For i=0, ..., n, and p=0, 1, ..., n−n*−1 define $X_{m+1}$ as $[X_{m+1}]_{i,p} = \chi_{\{i=p+n^*+1\}}$ For j=m, ..., 1:

STEP 620: Find $X_j$ by solving $$X_j^T N_j^+ = -X_{j+1}^T N_{j+1}^0 - \chi_{\{j \neq m\}} X_{j+2}^T N_{j+2}^- \quad (18)$$

where $N_j^+$, $N_{j+1}^0$, and $N_{j+2}^-$ are tridiagonal matrices defined in equations (8) to (10). Equation (18) is of the form $X^T A^T = B^T$, where $A^T$ is a tridiagonal matrix. As such, step 620 may be solved using, for example, the algorithm described above that solves equations of this form (i.e., equations of the form $X^T A^T = B^T$). Other comparable (or better) algorithms may alternatively be used to solve step 620.

STEP 630: Find $X_0$ by solving $$X_0^T \hat{N}_0^+ = B \quad (19)$$

where $\hat{N}_0^+$ and B are (n*+1)×(n*+1) non-singular tridiagonal matrices such that for k=0, ..., n*, and p=0, ... n*, $[\hat{N}_0^+]_{p,k} = [N_0^+]_{p,k}$ and $[B]_{p,k} = [-X_1^T N_1^0 - X_2^T N_2^-]_{p,k}$. Equation (19) is of the form $X^T A^T = B^T$, where $A^T$ is a tridiagonal matrix. As such, step 630 may be solved using, for example, the algorithm described above that solves equations of this form (i.e., equations of the form $X^T A^T = B^T$). Other comparable (or better) algorithms may alternatively be used to solve step 630.

STEP 640 (FIG. 6B): Find $\underline{x}_{m+1}$ by solving $$\sum_{p=0}^{n-n^*-1} x_{m+1,p+n^*+1} [X_0^T N_0^+ + X_1^T N_1^0 + X_2^T N_2^-]_{p,k} = 0 \quad (20)$$

k = n*+1, ..., n and $$\sum_{p=0}^{n-n^*-1} \left( \sum_{i=0}^{n^*} x_{m+1,p+n^*+1} [X_0]_{p,i} + \sum_{j=1}^{m} \sum_{i=0}^{n} x_{m+1,p+n^*+1} [X_j]_{p,i} + \sum_{i=n^*+1}^{n} x_{m+1,p+n^*+1} [X_{m+1}]_{p,i} \right) = 1. \quad (21)$$

The process solves step 640 by using Gaussian elimination or some other state of the art technique.

STEP 650: For j=0, ..., m solve $\underline{x}_j$ using equation (12) and then $\underline{e}_j$ using equation (6).

For all values of j, matrices $N_j^+$ and $\hat{N}_0^+$ will be tridiagonal if $v_j$ and $v_{j-1}$ are tridiagonal and, therefore, the exemplary process described above that solves AX=B is applicable to STEP 620 and STEP 630. Equations (20) and (21) represent n−n*+1 equations and n−n* unknowns. Hence, one of the equations in equation (20) can be discarded without loss of generality. Moreover, since $x_{m+1,p}$=0, p=0, ..., n*, the summation in equation (21) can start at i=n*+1 without loss of generality.

From equation (8), $[N_j^-]_{ik}$=0 for i=1, ..., n*. Therefore, the pk$^{th}$ component of the last term of equation (18) is also equal to $$\sum_{i=n^*+1}^{n} [X_2^T]_{pi} [N_2^-]_{ik}.$$

Simiarly, the second term pf $[B]_{pk}$ is $$-\chi_{\{j \neq m\}} \sum_{i=n^*+1}^{n} [X_{j+2}^T]_{pi} [N_{j+2}^-]_{ik}.$$

Each iteration of STEP 630 includes multiplication operations on the order of (n(n−n*)). Since there are m total iterations in STEP 630, STEP 630 includes multiplication operations on the order of (mn(n−n*)). STEP 640 involves multiplication operations on the order of ((n−n*)³). Overall, the process, consistent with the present invention, that solves two-dimensional birth-death equations has a maximum number of multiplication operations on the order of (mn²). In marked contrast, Gaussian elimination requires on the order of (m³n³) multiplication operations and a block Gaussian algorithm requires (mn³). It is evident that a process, consistent with the present invention, results in substantial savings of time when the values of m and/or n are large.

The following illustrates how an exemplary telecommunications performance issue can be modeled using a two-dimensional birth-death equation. Once modeled, the above-described process that solves two-dimensional birth-death equations can be used to quickly and accurately analyze the performance issue.

Consider an n channel system that has an arrival rate of $\lambda$, a service rate of $\mu$, and a hazard rate of redialing of $\eta$. Let i be the number of calls in service and j the number of calls that have been blocked one or more times and may redial. Let p be the probability that a blocked call will redial. Finally, assume that the maximum number of calls that have been blocked one or more times and may redial is m.

The balance equations at (i, j) for this model can be put in the form of equations (2) and (3) as follows:

For j=0, 1, . . . , m, $$[v_j^-]_{ik} = \begin{cases} j\eta & \text{if } k = i+1 \text{ and } i < n \\ (1-p)j\eta & \text{if } i = k = n \\ 0 & \text{otherwise} \end{cases}$$

$$[v_j^0]_{ik} = \begin{cases} i\mu & \text{if } k = i-1 \\ -i\mu - \lambda - j\eta & \text{if } k = i \text{ and } i < n \\ -i\mu - p\lambda\chi_{\{j \neq m\}} - (1-p)j\eta & \text{if } k = i = n \\ \lambda & \text{if } k = i+1 \text{ and } i < n \\ 0 & \text{otherwise} \end{cases}$$

and $$[v_j^+]_{ik} = \begin{cases} p\lambda\chi_{\{j \neq m\}} & \text{if } i = k = n \\ 0 & \text{otherwise} \end{cases}.$$

Note that this model satisfies equation (1) and, from equation (5), n*=n−1.

Let $$E_i = \sum_{j=0}^{m} e_{j,i}$$

and $$\bar{E}_i = \sum_{j=0}^{m} j e_{j,i}$$

then $\lambda E_i$ and $\eta \bar{E}_i$ are, respectively, the rate of external traffic and redial (i.e., internal) traffic that arrives while i calls are in service. Similarly, $p\lambda(E_n - e_{m,n})$ and $p\eta\bar{E}_n$ are, respectively, the rate of external and internal traffic that arrives, is blocked, that has room to join the redial pool, and so chooses. Therefore, using these expressions, one can show that the probability of getting service after the first attempt is $1 - E_n$, the probability of getting service, possibly after redialing one or more times, is the total rate of successful calls divided by the total rate of external calls, i.e., $$\frac{\sum_{i=0}^{n-1} (\lambda E_i + \eta \bar{E}_i)}{\lambda} = 1 - E_n + \frac{\eta}{\lambda} \sum_{i=0}^{n-1} \bar{E}_i,$$

the average number of attempts of each successful call is the total rate of call attempts that stay in the system divided by the rate of calls that are successful, i.e., $$N_s = \frac{p\lambda(E_n - e_{m,n}) + p\eta\bar{E}_n + \sum_{i=0}^{n-1} (\lambda E_i + \eta \bar{E}_i)}{\sum_{i=0}^{n-1} (\lambda E_i + \eta \bar{E}_i)},$$

and the average time to wait before a call is successful is $$\bar{W} = \frac{N_s - 1}{\eta} = \frac{p\lambda(E_n - e_{m,n}) + p\eta\bar{E}_n}{\eta \sum_{i=0}^{n-1} (\lambda E_i + \eta \bar{E}_i)}.$$

3. Exemplary Process that Solves Multi-Dimensional Birth-Death Equations

While two-dimensional birth-death equations may be used to analyze a wide variety of performance issues, there are times when two dimensions are not adequate. In such instances, a higher-dimensional birth-death equation is needed. This section provides an exemplary process for solving multi-dimensional birth-death equations.

Letting $\underline{j}=(j_1, \ldots, j_H)$ and $\underline{s}=(s_1, \ldots, s_H)$, the process defines the matrix $v_j^s$ such that the infinitesimal generator for the probability flow from $(j_1, \ldots, j_H, i)$ to $(j_1+s_1, \ldots, j_H+s_H, k)$ is $[v_{\underline{j}}^{\underline{s}}]_{i,k}$ where $s_i$ is equal to −1, 0, or 1. Note that "1" and "−1" are used instead of "+" and "−." The variable H hereinafter represents the number of dimensions in the system minus one. For example, in a three-dimensional system, H would equal 2.

To simplify the presentation of the analysis for H>1, the process defines the sets $$J = \{\underline{j}: 0 \leq j_h \leq n_h \text{ for all } h\},$$

$$S_0 = \{\underline{s}: 0 \leq s_h \text{ for all } h \neq 1 \text{ and } s_h = 1 \text{ for one or more } h\}, \quad (22)$$

$$M = \{\underline{m}: m_h = n_h + 1 \text{ for at least one } h \text{ and } n_h + 1 \geq m_h \geq 1 \text{ for all } h\},$$

and $$S(\underline{j}) = \{\underline{s}: \max(-1, j_h - n_h) \leq s_h \leq \min(1, j_h)\}, \underline{j} \in J$$

(so that $\underline{s} \in S(\underline{j})$ implies that $-1 \leq j_h \leq 1$ and $0 \leq j_h - s_h \leq n_k$ for all h), where $n_h$ represents the largest value of the state in the h dimension.

As a generalization of equation (1), $$\sum_{\underline{s} \in S(\underline{j})} v_{\underline{j}}^{\underline{s}} \underline{1} = \underline{0} \text{ for all } \underline{j} \in J \quad (23)$$

Equation (5) can be generalized by defining n* such that $$[v_{\underline{j}}^{\underline{s}}]_{i,k} = 0, i = 0, \ldots, n^* \underline{s} \in S_0, \text{ all } k \text{ and all } \underline{j} \in J. \quad (24)$$

Equations (8) and (9) can be generalized by defining $N_{\underline{j}}^+$ as an (n+1)×(n+1) matrix such that $$[N_{\underline{j}}^+] = \begin{cases} ([v_{\underline{j}}^0])_{i,k} & \text{if } i = 0, \ldots, n^* \\ ([v_{\underline{j}-1}^1])_{i,k} & \text{if } i = n^* + 1, \ldots, n \end{cases} \quad (25)$$

and $\hat{N}_{\underline{j}}^+$ as an n*+1×n*+1 matrix such that $$[\hat{N}_{\underline{j}}^+]_{ik} = [v_{\underline{j}}^0]_{ik} \text{ for } i = 0, \ldots, n^* \text{ and } k = 0, \ldots, n^*. \quad (26)$$

To generalize equation (6), the process defines $$[e_{\underline{j}}]_i = \begin{cases} R(\underline{j})[x_{\underline{j}}]_i & \text{if } i = 0, \ldots, n^* \\ R(\underline{j})[x_{\underline{j}+1}]_i & \text{if } i = n^* + 1, \ldots, n \end{cases} \quad (27)$$

where $$R(j) = \sum_{h=1}^{H} \sum_{j=1}^{j_h} r_j^{(h)} \quad (28)$$

where, for example, $$r_j^{(h)} = \frac{\sum_{\{j: j \in J \text{ but } j_h = j\}} \sum_{\{s: s \in S(j) \text{ but } s_h = 1\}} 1^T v_j^s 1}{\sum_{\{j: j \in J \text{ but } j_h = j+1\}} \sum_{\{s: s \in S(j) \text{ but } s_h = -1\}} 1^T v_j^s 1} \quad (29)$$

and $\underline{x}_j$ is an (n+1) dimensional vector if $j_h \neq 0$ for all h and is otherwise an (n*+1) dimensional vector. The variable R(j) represents a scaling factor. It is possible to execute the exemplary process that solves multi-dimensional birth-death equations without using a scaling factor; however, in order to improve numerical stability, a scaling factor may be used. Alternative techniques for determining a scaling factor exist and may be substituted for equations (26) to (29).

From the definition of M and equation (27) if $\underline{m} \in M$ and i=0, . . . , n*, $[\underline{e}_m]_i = [\underline{x}_m]_i$ has at least one component $m_h > n_h$. Since such values of $\underline{e}_j$ are not of interest, they can be set to zero without loss of generality. Similarly, if the set M permits the inclusion of letting $m_h = 0$ in M then, from equation (27), for i=n*+1, . . . , n, $[\underline{e}_m - 1]_i = [\underline{x}_m]_i$ would have a component which is −1 and, again, is not of interest. Hence, the possibility of $m_h = 0$ is excluded from the definition of M.

In three dimensions, i.e., H=2, equation (2) generalizes to the steady state ergodic equation that reflects that the probability flow into j equals the probability flow out of j and is, for $j_1 = 0, \ldots, n_1$ and $j_2 = 0, \ldots, n_2$ $$\chi_{\{j_1 = 0 \text{ and } j_2 = 0\}} \underline{e}_{j_1 - 1, j_2 - 1}^T v_{j_1 - 1, j_2 - 1}^{1,1} +$$
$$\chi_{\{j_1 = 0\}} \underline{e}_{j_1 - 1, j_2}^T v_{j_1 - 1, j_2}^{1,0} + \chi_{\{j_2 = n_2\}} \chi_{\{j_1 = 0\}} \underline{e}_{j_1 - 1, j_2 + 1}^T$$
$$v_{j_1 - 1, j_2 + 1}^{1, -1} + \chi_{\{j_2 = 0\}} \underline{e}_{j_1, j_2 - 1}^T v_{j_1, j_2 - 1}^{0,1} \underline{e}_{j_1, j_2}^T v_{j_1, j_2}^{0,0} + \chi_{\{j_2 = n_2\}}$$
$$\underline{e}_{j_1, j_2 + 1}^T v_{j_1, j_2 + 1}^{0, -1} + \chi_{\{j_1 = n_1\}} (\chi_{\{j_2 = 0\}} \underline{e}_{j_1 + 1, j_2 - 1}^T$$
$$v_{j_1 + 1, j_2 - 1}^{-1, 1} + \underline{e}_{j_1 + 1, j_2}^T v_{j_1 + 1, j_2}^{-1, 0} + \chi_{\{j_2 = n_2\}}$$
$$\underline{e}_{j_1 + 1, j_2 + 1}^T v_{j_1 + 1, j_2 + 1}^{-1, -1}) = \underline{0}.$$

where $n_2$ is the largest value of the second dimension. As described above, when the condition of the subscript associated with $\chi$ is true, the value of $\chi$ equals 1 and equals 0 otherwise.

For any dimension, the equivalent expression can be concisely expressed as $$\sum_{s \in S(j)} \underline{e}_{j-s}^T v_{j-s}^s = \underline{0}, \text{ for all } j \in J. \quad (30)$$

Hence, using equation (27)

$$\sum_{s \in S(j)} R(j-s) \left( \sum_{i=0}^{n^*} [\underline{x}_{j-s}]_i [v_{j-s}^s]_{i,k} + \sum_{i=n^*+1}^{n} [\underline{x}_{j-s+1}]_i [v_{j-s}^s]_{i,k} \right) = 0$$

for all $j \in J$ where n* is defined in equation (24).

After dividing both sides by R(j), using equations (24) and (25), and rearranging the terms the following is obtained, for all $j \in J$, $$[x_j^T N_j^+]_k = -\sum_{\substack{s \in S(j) \\ s \neq \underline{0}, s \neq s_0}} \frac{R(j-s)}{R(j)} \sum_{i=0}^{n^*} [\underline{x}_{j-s}]_i [v_{j-s}^s]_{i,k} - \quad (31)$$

$$\sum_{\substack{s \in S(j) \\ s \neq \underline{1}}} \frac{R(j-s)}{R(j)} \sum_{i=n^*+1}^{n} [\underline{x}_{j-s+1}]_i [v_{j-s}^s]_{i,k}.$$

The normalization equation along with equation (27) provides $$1 = \sum_{j \in J} \sum_{i=0}^{n} [\underline{e}_j]_i = \sum_{j \in J} \left[ R(j) \left( \sum_{i=0}^{n^*} [\underline{x}_j]_i + \sum_{i=n^*+1}^{n} [\underline{x}_{j+1}]_i \right) \right] \quad (32)$$

Rather than directly solve for $\underline{x}_j$, this process treats the p+n*+1 components of $\underline{x}_m$ as a basis for $\underline{m} \in M$ and p=0, . . . , n−n*−1, and solves for the coefficients that relate the $\underline{x}_m$'s to $\underline{x}_j$'s.

Specifically, the process consistent with the present invention assumes for all j $$[\underline{x}_j]_i = \sum_{\underline{m} \in M} \sum_{p=0}^{n-n^*-1} [X_j^m]_{i,p} [\underline{x}_m]_{p+n^*+1} \quad (33)$$

where $X_j^m$ is an (n+1)×(n−n*) matrix if $j_h \neq 0$ for all h, and an (n*+1)×(n−n*) matrix if $j_h = 0$ for some h and then solves for the $X_j^m$'s.

For notational clarity, motivated by equation (25), the (n−n*)×(n+1) matrix $B_j^m$ be defined such that for p=0, . . . , n−n*−1 and k=0, . . . , n $$[B_j^m]_{p,k} = -\sum_{\substack{s \in S(j) \\ s \neq \underline{0}, s \neq s_0}} \sum_{i=0}^{n^*} \frac{R(j-s)}{R(j)} [X_{j-s}^m]_{i,p} [v_{j-s}^s]_{i,k} - \quad (34)$$

$$\sum_{\substack{s \in S(j) \\ s \neq \underline{1}}} \sum_{i=n^*+1}^{n} \frac{R(j-s)}{R(j)} [X_{j-s+1}^m]_{i,p} [v_{j-s}^s]_{i,k}$$

Assume $\hat{B}_j^m$ is an n−n*×n*+1 matrix defined by $$[\hat{B}_j^m]_{p,k} = [B_j^m]_{p,k} \text{ for } p=0, \ldots, n-n^*-1 \text{ and } k=0, \ldots, n^*, \quad (35)$$

$$C[(j,k),(m,p)] = \sum_{i=0}^{n^*} [X_j^m]_{i,p} [N_j^+]_{i,k} - [B_j^m]_{p,k} \quad (36)$$

and $$c[m,p] = \sum_{j \in J} \left[ R(j) \left( \sum_{i=0}^{n^*} [X_j^m]_{i,p} + \sum_{i=n^*+1}^{n} [X_{j+1}^m]_{i,p} \right) \right] \quad (37)$$

Figure 7A:
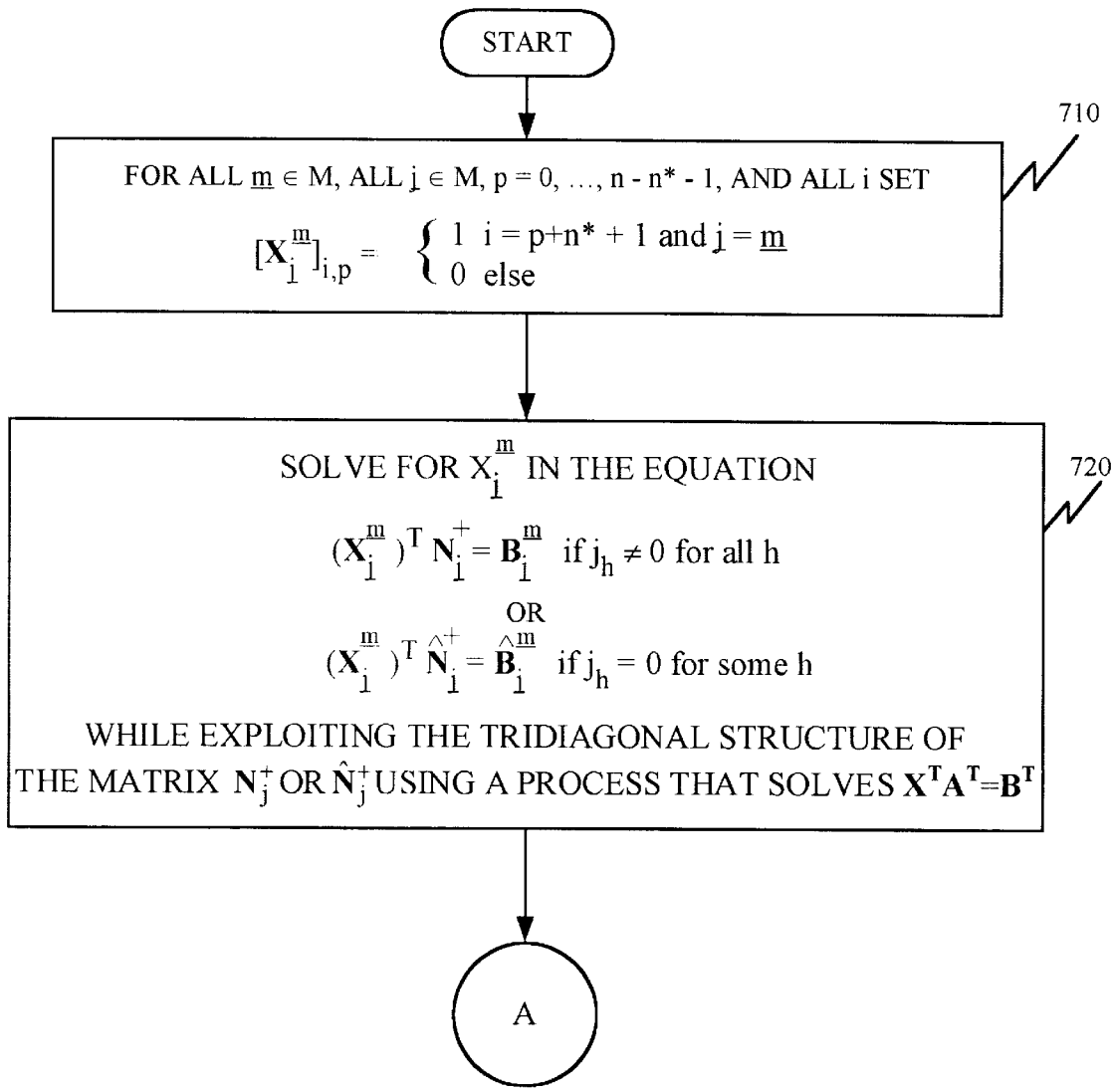
FIGS. 7A and 7B illustrate an exemplary process consistent with the present invention that solves multi-dimensional birth-death equations.
Figure 7B:
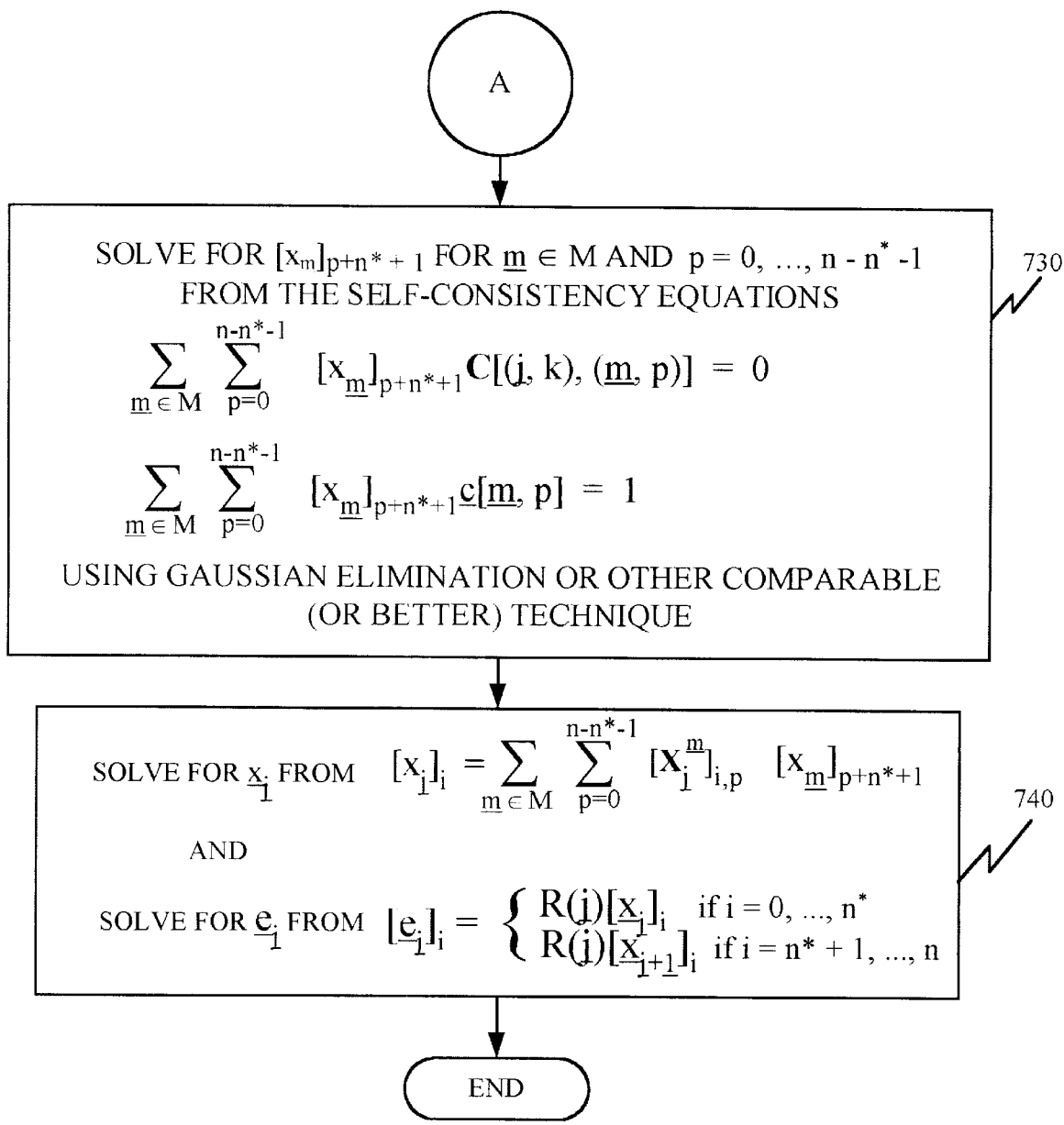

FIGS. 7A and 7B illustrate an exemplary process consistent with the present invention that solves multi-dimensional birth-death equations. The exemplary process consists of the following:

STEP 710(FIG. 7A): Initialization: For all $m \in M$, all $j \in M$, p=0, . . . , n–n*–1, and all i (whose range depends of j) set $$[X_j^m]_{i,p} = \begin{cases} 1 & i = p + n^* + 1 \text{ and } j = m \\ 0 & \text{else} \end{cases} \quad (38)$$

STEP 720: Solving for X
   For $j_H = n_H, \ldots, 0$:
      For $j_{H-1} = n_{H-1}, \ldots, 0$:
         . . .
         For $j_1 = n_1, \ldots, 0$:
   For $m \in M$:
      Let $j = (j_1, \ldots j_H)^T$.
      Solve for $X_j^m$ in the equation $$(X_j^m)^T N_j^+ = B_j^m \text{ if } j_h \neq 0 \text{ for all h} \quad (39)$$

or $$(X_j^m)^T \hat{N}_j^{30} = \hat{B}_j^m \text{ if } j_h = 0 \text{ for some h} \quad (40)$$

where $B_j^m$, $\hat{B}_j^m$, $N_j^+$, and $\hat{N}_j^+$ are defined in equations (34), (35), (25), and (26), respectively. Equations (39) and (40) are of the form $X^T A^T = B^T$. As such, these equations may be solved using the process described above with respect to equations (15) to (17) or some other comparable (or better) process. Because of the tridiagonal structure of $N_j^+$ and $\hat{N}_j^+$ these equations can be solved very quickly.

STEP 730(FIG. 7B): Solving for $\underline{x}$: Solve for $[x_m]_{p+n^*+1}$ for $m \in M$ and p=0, . . . , n–n*–1 from the self-consistency equations $$\sum_{m \in M} \sum_{p=0}^{n-n^*-1} [x_m]_{p+n^*+1} C[(\underline{j}, k), (\underline{m}, p)] = 0 \quad (41)$$

for all $j \in J$ with $j_h = 0$ for some h and k=n*+1, . . . , n but not $\underline{j} = \underline{0}$ and k=n (as this is a redundant equation) where C is defined in equation (36), and $$\sum_{m \in M} \sum_{p=0}^{n-n^*-1} [x_m]_{p+n^*+1} c[m, p] = 1 \quad (42)$$

where c is defined in equation (37). Equations (41) and (42) may be solved using Gaussian elimination or some other comparable (or better) technique.

STEP 740: Completing the computations:
   Solve for $\underline{x}_j$ using equation (33) for $j \notin M$ and for $\underline{e}_j$ using equation (27) for $j \in J$.

Similar to the two-dimensional case, the process that solves multi-dimensional birth-death equations in a manner consistent with the present invention drastically reduces the number of multiplication operations over conventional techniques. This process affords system designers the ability to model and analyze complex issues quickly and easily. As such, better engineering of telecommunication systems, more efficient use of resources, and a reduction in the amount of time for solving multi-dimensional birth-death equations can be achieved.

CONCLUSION

Systems and methods consistent with the present invention provide a mechanism by which performance issues of a wireless communication system may be quickly and accurately analyzed. A multi-dimensional birth-death model is configured to address a performance issue. A first group of states from the multi-dimensional birth-death model is carefully selected and a relationship determined between the non-selected states and this first group. Thereafter, a processor calculates the probabilities of the first group of states. Once calculated, the processor calculates the probabilities of the remaining states using the relationship between the non-selected states and the first group of states. The processor solves the multi-dimensional birth-death model based on the calculated states of the first and non-selected groups of states.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the process that solves multi-dimensional birth-death equations, consistent with the present invention, was described as being used to analyze a performance issue associated with a wireless communication system, one skilled in the art will appreciate that this technique is equally applicable to any arena (e.g., image processing, speech processing, etc.) where multi-dimensional birth-death equations may be used.

The scope of the invention is defined by the following claims and their equivalents.

What is claimed is:

1. A computer-executable method that solves a multi-dimensional birth-death model, having a plurality of states representing modes of a system, for analyzing a performance factor associated with the system, said method comprising:
   selecting a first group of states and a second group of states from said plurality of states;
   determining a relationship between the second group of states and the first group of states;
   determining a probability of being in each of the first group of states;
   determining a probability of being in each of the second group of states based on the relationship and the determined probabilities of the first group of states; and
   solving the multi-dimensional birth-death model using the determined probabilities of the first and second groups of states to analyze the performance factor associated with the system.

2. The method of claim 1 wherein the selecting step is performed in a specific way so as to exploit a tridiagonal structure of the model.

3. An apparatus that solves a multi-dimensional birth-death model, having a plurality of states representing modes of a system, to analyze a performance factor associated with the system, said apparatus comprising:
   means for selecting a first group of states and a second group of states;
   means for determining a relationship between the second group of states and the first group of states;
   means for determining a probability of being in each of the first group of states;
   means for determining a probability of being in each of the second group of states based on the relationship and the determined probabilities of the first group of states; and
   means for solving the multi-dimensional birth-death model using the determined probabilities of the first and second groups of states to analyze the performance factor associated with the system.

4. An apparatus that solves a multi-dimensional birth-death equation in order to analyze a performance factor associated with a system, said apparatus comprising:

a memory that stores information representing the multi-dimensional birth-death equation, the equation having a plurality of states; and a processing unit that selects a first group of the states and a second group of the states, that determines a relationship of the second group of states to the first group of states, that calculates a probability of being in each of the first group of states, and that calculates a probability of being in each of the second group of states based on the relationship and the calculated probabilities of the first group of states, and that solves the multi-dimensional birth-death equation using the determined probabilities of the first and second groups of states to analyze the performance factor associated with the system.

5. The apparatus of claim 4 wherein the system is a telecommunications network.

6. The system of claim 4 wherein the processing unit selects the first group of states so as to exploit a tridiagonal structure of the multi-dimensional birth-death equation.

7. A method that analyzes a performance factor associated with a network including a computer, said method, performed by said computer, comprising:

representing the performance factor with a multi-dimensional birth-death model;

identifying first and second groups of states in the multi-dimensional birth-death model;

determining a relationship between the second group of states and the first group of states;

determining a probability of being in each of the first group of states; and determining a probability of being in each of the second group of states using the relationship and the determined probabilities of the first group of states, the determined probabilities of the first and second states being used by the computer to analyze the performance factor associated with the network.

8. A computer-readable medium containing instructions for controlling at least one processor to perform a method that analyzes a performance factor associated with a system by solving a multi-dimensional birth-death equation having a plurality of states, each state representing a mode that the system may be in at a particular instance, the method comprising:

selecting a first group of states and a second group of states from the plurality of states;

determining a relationship between the second group of states and the first group of states;

determining a probability of being in each of the first group of states;

determining a probability of being in each of the second group of states based on the relationship and the determined probabilities of the first group of states;

solving the multi-dimensional birth-death equation using the determined probabilities of the first and second groups of states, the solution being used by the processor to analyze the performance factor associated with the system.

* * * * *